United States Patent [19]

Spehrley, Jr.

[11] Patent Number: 4,951,067

[45] Date of Patent: Aug. 21, 1990

[54] CONTROLLED INK DROP SPREADING IN HOT MELT INK JET PRINTING

[75] Inventor: Charles W. Spehrley, Jr., Hartford, Vt.

[73] Assignee: Spectra, Inc., Hanover, N.H.

[21] Appl. No.: 202,488

[22] Filed: Jun. 3, 1988

Related U.S. Application Data

[63] Continuation-in-part of Ser. No. 94,664, Sep. 9, 1987, Pat. No. 4,751,528.

[51] Int. Cl.⁵ .......................... G01D 14/15; B41J 2/01

[52] U.S. Cl. ................................................ 346/140 R

[58] Field of Search ................................ 346/140, 1.1

[56] References Cited

U.S. PATENT DOCUMENTS 4,741,930 5/1988 Howard .............................. 346/1.1

4,751,528 6/1988 Spehrley et al. ..................... 346/1.1

FOREIGN PATENT DOCUMENTS 56-113462 9/1981 Japan ............................ 346/140 PD

*Primary Examiner*—Mark J. Reinhart

*Attorney, Agent, or Firm*—Brumbaugh, Graves, Donohue & Raymond

[57] ABSTRACT

In the particulate embodiments described in the specification, a hot melt ink jet system includes a temperature-controlled platen provided with a heater and with a thermoelectric cooler electrically connected to a heat pump, and a temperature control unit for controlling the operation of the heater and the heat pump to maintain a substrate on the platen which receives the ink at a temperature which provides a desired spot size without causing print-through. In certain embodiments, the substrate temperature is from about 20° C. above to about 20° C. below the melting point of the ink and is determined by subtracting half the difference between the jetting temperature and the temperature at which the ink has a viscosity of about 200–300 cp from the latter temperature. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

14 Claims, 10 Drawing Sheets

CONTROLLED INK DROP SPREADING IN HOT MELT INK JET PRINTING

REFERENCE TO RELATED APPLICATION

This application is a continuation-in-part of the co-pending Spehrley et al. U.S. Application Ser. No. 07/094,664, filed Sept. 9, 1987, now U.S. Pat. No. 4,751,528.

BACKGROUND OF THE INVENTION

This invention relates to hot melt ink jet printing systems and, more particularly, to a new and improved hot melt ink jet printing system providing controlled ink drop spreading and penetration for enhanced image quality.

Ink jet systems using inks prepared with water or other vaporizable solvents require drying of the ink (i.e., vaporization of the solvent) after it has been applied to a substrate, such as paper, which is supported by a platen. To facilitate drying of solvent-based inks, heated platens have previously been provided in ink jet apparatus.

Certain types of ink jet apparatus use inks, called "hot melt" inks, which contain no solvent and are solid at room temperature, are liquefied by heating for jet application to the substrate, and are resolidified by freezing on the substrate after application. In addition, the application of hot melt ink to a substrate by an ink jet apparatus transfers heat to the substrate. Moreover, the solidification of hot melt ink releases further thermal energy which is transferred to the substrate and supporting platen, which does not occur with the application of solvent-based inks. With high-density coverage this can raise the temperature of the paper and the platen above limits for acceptable ink penetration.

In the co-pending Spehrley et al. U.S. Application Ser. No. 094,664 filed Sept. 9, 1987, now U.S. Pat. No. 4,751,528, hot melt ink jet apparatus is described in which the temperature of the platen supporting the print medium is controlled. As described in that application, if the substrate temperature is too low, the ink freezes after a short distance of penetration into a porous substrate such as paper, producing raised ink droplets and images with an embossed characteristic. Such ink droplets or images may have poor adhesion or may easily be scraped off or flake off by action of folding or creasing or may be subject to smearing or offsetting to other sheets. Further, raised images having an embossed appearance and a height exceeding about 0.4 mils are often found to be objectionable in the office printing environment. If the paper temperature is too high, however, the size of the ink spot from each drop will vary depending on the characteristics of the paper and, in some cases, the ink does not solidify before it has penetrated completely through the paper, resulting in a defective condition called "print-through".

To overcome these difficulties in accordance with that co-pending application, the support platen temperature is controlled, and by means of intimate thermal contact thereto, the paper substrate temperature is kept at a desired level so that the resulting image stays constant, independent of ambient temperature changes and independent of other printing conditions such as the amount of ink deposited on the paper surface.

It has been suggested in the co-pending application that substrate temperatures above the melting point of the hot melt ink may produce images with larger-than-normal spot size, fuzzy edges, blooming of fine lines, and the like. In addition, even if the substrate temperature were held constant, the image characteristic might vary according to paper characteristics, such as basis weight, rag content, void content, sizing, filler and roughness, because freezing of the ink would not terminate penetration of the ink into the substrate resulting from the thermal interaction of the ink and paper. It is known in the art that hot melt inks produce much more constant image characteristics than do nonfreezing ink systems based on water or glycol. It has heretofore been believed that, if the substrate temperature is allowed to exceed the melting point of a hot melt ink, the thermal stabilizing effect would be lost, and it would not be possible to provide uniformly high printing quality with hot melt inks on a variety of paper substrates. As a consequence, it has been assumed that many inks which have otherwise desirable characteristics cannot be jetted without objectionable embossing or without adequate smear resistance because the inks do not penetrate optimally.

SUMMARY OF THE INVENTION

Accordingly, it is an object of the present invention to provide a new and improved hot melt ink jet printing system which is effective to overcome the above-mentioned disadvantages of the prior art.

Another object of the present invention is to provide a hot melt ink jet printing system which is especially adapted for use with a variety of substrate materials having different characteristics.

A further object of the invention is to eliminate the necessity for precise control of the cooling time for hot melt ink applied to a substrate to avoid insufficient or excessive penetration of the ink into the substrate and the corresponding requirement for continuous, constant-speed printing to maintain a desired substrate temperature.

These and other objects and advantages of the invention are attained by providing a hot melt ink jet printing system wherein the hot melt ink-receiving substrate is maintained at a selected temperature above or below the melting point of the hot melt ink, the selected temperature being dependent upon the jetting temperature of the ink and the melting characteristics of the ink, and particularly the relationship between the viscosity of the ink and its temperature. Surprisingly, for substrate temperatures within a limited temperature range above the ink melting point, which are selected in accordance with those characteristics, the ink does not flow sufficiently through most substrates to cause "print-through", but spreads sufficiently to eliminate any raised or embossed effect and to produce enlarged uniform spots which do not have ragged edges. It has now been found that spreading and penetration is terminated by the combined thermal properties of the ink and the paper, and these thermal characteristics vary only within relatively narrow limits across a wide variety of paper types.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
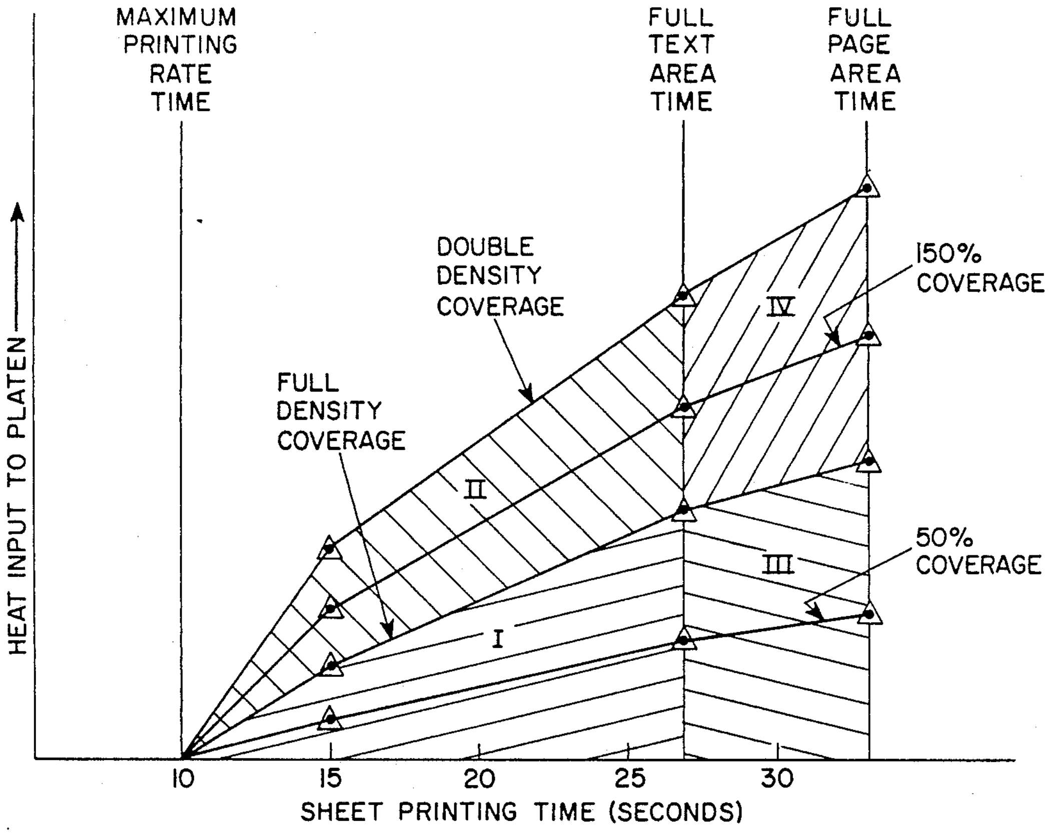
FIG. 1 is a schematic graphical representation showing the heat input to a platen supporting a sheet substrate being printed with an ink jet for various sheet printing times and print coverage values.

In ink jet printing, the size of an ink spot on the substrate which receives an ink drop depends on the initial drop volume and the degree to which the ink in the drop interacts with the substrate, which affects the extent of spread. In water-based ink jet systems applied to paper, the ink wets the paper fibers and the ink drop spreads under the influence of surface tension until it is fully absorbed by the fibers. This is generally considered a deficiency, since the variation in absorbing characteristics of a range of plain papers is so great as to produce widely different print characteristics on different papers.

In hot melt ink printing systems, the ink also wets the paper fibers and ink spreading and penetration are driven by surface tension forces. With hot melt ink, however, the drop spread is limited by the cooling of the ink, which shares its thermal energy with the paper fibers until it freezes or until its viscosity becomes so high as to limit spreading motion. When the substrate temperature is below the melting point of the ink, the ink drop tends to freeze quickly, before it can spread to any substantial extent in the paper and, since most papers have reasonably similar specific heats, the drop spread is determined largely by the initial temperatures of the ink drop and the paper substrate in relation to the solidification characteristics of the ink. Although such rapid freezing tends to obscure the different characteristics of papers so that similar images may be obtained on different papers if the substrate temperature is properly controlled, it can also prevent sufficient absorption of ink into the paper, resulting in formation of an embossed image having a minimum ink spot size.

In hot melt ink jet printers, the thermal energy applied to a unit area of a substrate such as paper depends upon the temperature of the hot melt ink when it reaches the substrate, the energy of solidification of the hot melt ink and the coverage of the substrate with ink during the printing. The temperature of the substrate immediately after printing depends upon the thermal energy applied during printing, the initial temperature of the substrate, and the temperature of a heat-conductive element such as a platen with which the substrate is in heat transfer relation.

Thus, a hot melt ink which solidifies at a melting point below the temperature at which it is applied to the substrate may solidify almost immediately if the substrate and its supporting platen are at a low temperature, substantially below the ink melting point, which may occur during start-up of the system. Such immediate solidification prevents sufficient penetration of the hot melt ink into the substrate before it solidifies. On the other hand, if the substrate and its supporting platen are at a temperature substantially above the melting point of the hot melt ink, a relatively long time, such as several seconds, may be provided for solidification until after the substrate has been removed from the platen, thereby permitting uncontrolled drop spread or print-through of the printed image. Such high substrate temperatures require accurate control of the time the image and the substrate spend on the heated platen, so that printing must be performed at a constant rate, which would require continuous supply of print data.

For example, a modern high-speed hot melt printer with a 96-jet head applying two layers of ink drops of different colors at a temperature of 130° C. to a substrate at a rate of 12,000 drops per second per jet with a linear density of 300 dots per inch, providing a total ink thickness of 0.9 mil, raises the bulk temperature of a 4-mil paper substrate by about 21° C. during the printing operation. With continued printing of a substrate which moves over a fixed platen in that manner, the platen temperature soon reaches a level which is above the desired temperature for controlled spread and penetration.

FIG. 1 of the accompanying drawings illustrates schematically in graphical form the heat energy applied to a supporting platen when an 8.5"×11" paper sheet moving across the platen is being printed with hot melt ink.

As described hereinafter with reference to FIG. 4, there are a plurality of energy fluxes which determine whether there is a net heat input to the paper/platen system, in which case the temperature will tend to rise, or whether there is a net heat outflow from the paper/platen system, in which case the temperature in the printing zone will decrease. Heat energy is inputted to the system by heat transfer from the heated print head across the air gap via conduction, convection and radiation, by the enthalpy in the ink drops, by the optional electrical power provided selectively by the heater controller, and by the heat content of the paper which enters the system. Energy outflow from the system includes heat energy in the paper and ink (which exits at a temperature higher than the paper's input temperature), heat transferred via convection from the platen and from the paper which is not covered by the print head to the surrounding air, heat transferred from the platen via conduction to the surrounding structure, via conduction to any air which is caused to flow over said platen, through mounts and/or selectively via heat pump action of thermoelectric coolers.

As shown in FIG. 1, the heat input, represented by the ordinate in the graph, increases with increasing sheet printing time and with increasing percent coverage of the substrate. In this illustration, typical sheet printing times vary from about 10 seconds minimum to about 33 seconds maximum. These printing times are shown in FIG. 1 and, as illustrated in the graph, the highest net heat input occurs at the slowest sheet printing time because the slowly moving sheet removes less thermal energy from the paper/platen system than is delivered by the enthalpy in the hot ink drops and by thermal transfer from the print head to the paper/platen system.

Similarly, at any given sheet printing time, the heat input to the platen increases with increasing printing coverage, which is the percentage of sheet area covered by ink. Where two or more different colored inks are applied, the colored inks usually overlie each other at least to some extent. Consequently, the graphical illustration in FIG. 1 illustrates the heat input to the platen not only for 50% and 100% sheet coverage, but also for sheet coverage in excess of 100%, such as 150% and 200%, which corresponds to coverage of the entire sheet by two layers of ink. In general, sheets with lower average coverage require less printing time due to throughput-enhancing features such as white-space skipping, logic-seeking, and the like.

FIG. 1 illustrates heat input to the platen under various printing conditions in four sections labelled I, II, III and IV. Section I shows the heat input to the platen when printing the 7"×9" normal full text area of an 8.5"×11" sheet with up to full density with a single layer of hot melt ink. When up to two full layers of hot melt ink are applied in overlying relation to the sheet during color printing, the heat energy transferred to the platen is illustrated in the section designated II. In that case, as shown in FIG. 1, up to twice the heat energy is transferred to the platen.

The section designated III in FIG. 1 illustrates the heat input to the platen when printing a single layer of ink at up to full density on a "full page" area of an 8.5"×11" sheet, i.e., to within 0.38" of the top, left and bottom edges and within 0.10" of the right edge of the sheet, and the section designated IV illustrates the heat input for full-page area printing with up to a double layer of hot melt ink. With color printing of solid area patterns, such as pie charts or the like, operation is frequently in the region designated III and IV, providing very high thermal energy input to the platen.

The platen temperature depends not only on the rate of heat input, but also on the rate of removal of heat energy from the platen. To maintain a selected platen temperature assuring proper operation of a hot melt ink jet apparatus, especially under conditions such as are shown in sections III and IV, therefore, heat energy must be applied to or removed from the platen rapidly and efficiently. It has been found that removal of the heat energy from a platen by conduction or convection to a moving air stream may be inadequate, especially when the local ambient air temperature rises to within 5° or 10° C. of the operating set point. At these and other times, the system is incapable of sufficiently precise control to maintain the platen temperature within desired limits for optimum operation.

For example, on initial start-up, a conductively or convectively cooled platen will be at room temperature (i.e., 21° C.) whereas, in order to allow sufficient penetration of a hot melt ink into a fibrous substrate such as paper prior to solidification, it is desirable to maintain the substrate at a high temperature. On start-up, therefore, the addition of heat to the platen is necessary. On the other hand, when continuous printing of the type described above occurs using hot melt ink at 130° C., for example, the platen temperature quickly reaches and substantially exceeds the melting point of the hot melt ink, thereby requiring removal of heat from the platen. Furthermore, frequent and extreme changes in the printing rate such as occur in the reproduction of solid-colored illustrations such as pie charts intermittently with single-color text will cause corresponding extreme fluctuations in the temperature of the platen and the substrate being printed, resulting in alternating conditions of print-through and insufficient ink penetration into the substrate.

Figure 2:
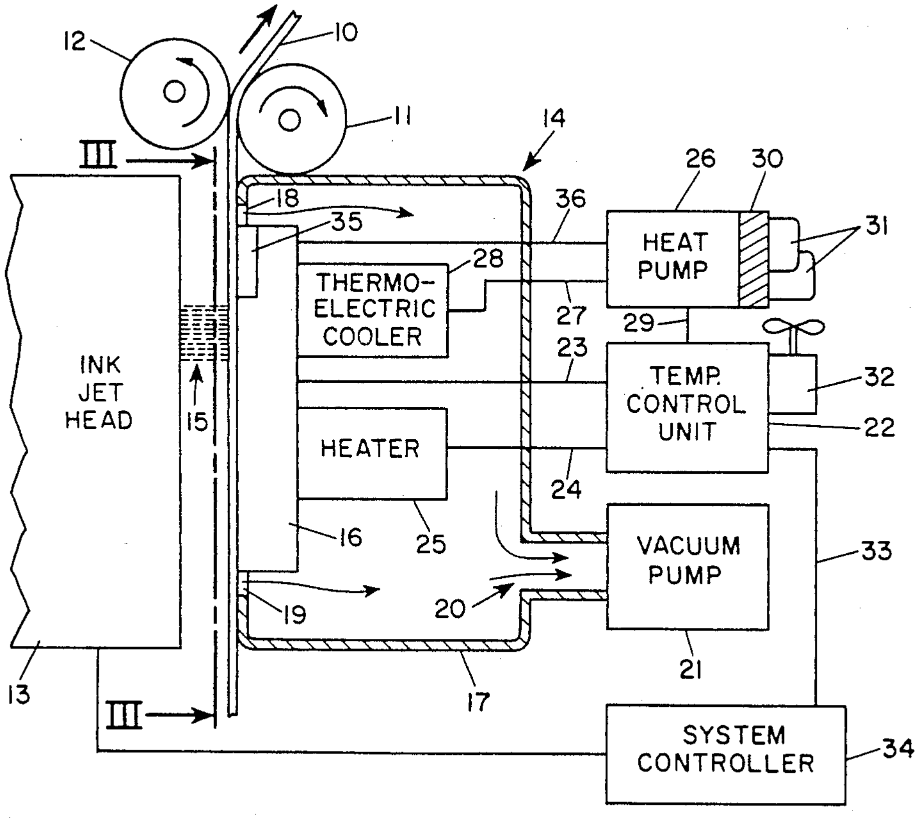
FIG. 2 is a schematic sectional view illustrating a representative hot melt ink printing system in accordance with the present invention.
Figure 3:
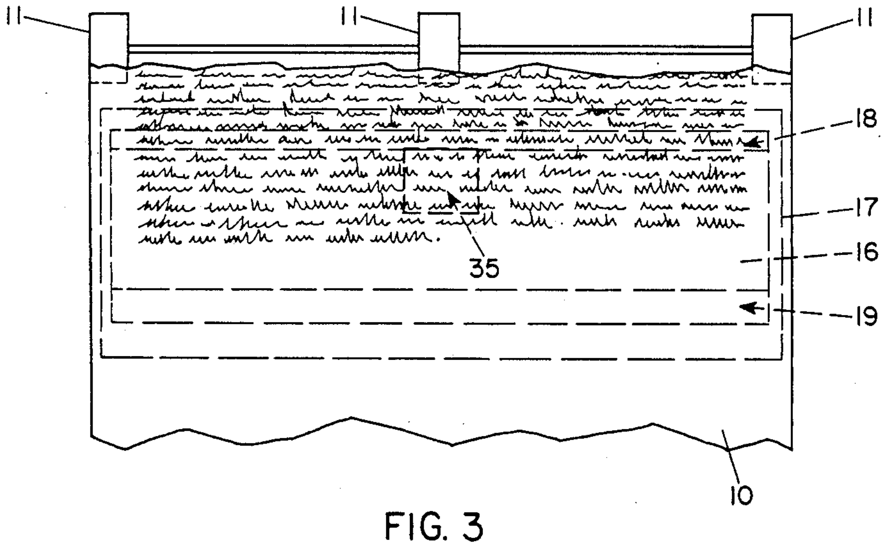
FIG. 3 is a schematic sectional view taken along the lines III—III of FIG. 2 and looking in the direction of the arrows.

In the representative embodiment of the invention illustrated in FIGS. 2 and 3, the platen temperature of a hot melt ink jet apparatus is maintained at a desired level to provide continuous optimum printing conditions. As shown in FIG. 2, a sheet or web 10 of a substrate material such as paper is driven by a drive system including a set of drive rolls 11 and 12 which rotate in the direction indicated by the arrows to move the substrate material through the gap between an ink jet head 13 and a platen assembly 14. The ink jet head is reciprocated perpendicularly to the plane of FIG. 2 so as to project an array of ink jet drops 15 onto the surface of the substrate in successive paths extending transversely to the direction of motion of the web 10 in a conventional manner. The platen assembly 14 includes a platen 16 mounted in a housing 17 having slit openings 18 and 19 at the upper and lower edges of the platen 16 and an exhaust outlet 20 at the rear of the housing leading to a vacuum pump 21 or blower. The housing 17 may be substantially airtight, or for purposes of substantially continuous heat removal to the air, even when paper covers the face openings, additional air ports may be provided. As best seen in FIG. 3, the platen 16 the width of the web 10 of substrate material and the web is driven by three drive rolls 11 which form corresponding nips with adjacent pinch rolls 12, one of which is shown in FIG. 2.

To assure that the temperature of the substrate 10 is maintained at the desired level to permit sufficient penetration of the hot melt ink drops 15 to provide uniform spot size and avoid an embossed appearance without permitting print-through, a temperature control unit 22 detects the temperature of the platen 16 through a line 23. If it is necessary to heat the platen to maintain the desired platen temperature, for example, on start-up of the apparatus or when printing at low coverage or with low sheet printing times, the control unit 22 supplies power through a line 24 to a conventional resistance-type heater or thermistor 25 to heat the platen until it reaches the desired temperature of operation.

In addition, an electrical heat pump 26 is connected by a line 27 to a thermoelectric cooler 28, for example, of the type designated CP 1.0-63-06L, available from Melcor, which is in thermal contact with the platen 16. When the temperature control unit 22 detects a platen temperature above the desired level resulting, for example, from printing at high coverage or with high sheet printing times, it activates the heat pump through a line 29 to transfer thermal energy from the thermoelectric cooler 28 through the line 27 to the pump which in turn transfers thermal energy to a heat sink 30. The heat sink 30, which may, for example, be a structural support member for the entire platen assembly, has fins 31 with a forced air cooling arrangement 32 to assure a high rate of heat removal to permit the heat pump 26 to maintain the desired platen temperature. If extreme conditions are encountered in which the heat energy is supplied to the web 10 and the platen 16 by the ink jet head 13 at a rate which exceeds the capacity of the thermoelectric cooler 28 and the heat pump 26 to maintain the desired temperature, the control unit 22 may send a command signal through a line 33 to an ink jet system control device 34 which will reduce the rate at which ink drops are applied by the ink jet head 13 to the web 10 until the heat pump 26 is again able to maintain a constant platen temperature.

Although the platen temperature and the motion of the substrate are thus controlled to assure solidification after adequate penetration of the ink drops from the array 15 into the substrate 10, the temperature of the solidified ink drops may not be low enough when the substrate reaches the nip between the drive rolls 11 and the pinch rolls 12 to prevent offsetting of ink onto the pinch roll 12 opposite the center drive roll 11 shown in FIG. 3. To avoid that possibility, a small quench zone is provided by another thermoelectric cooler 35 connected by a line 36 to the heat pump 26 which is arranged to maintain a temperature in that zone substantially lower, such as 10–20° C., than the temperature of the platen 16 in order to assure complete solidification of the ink in that zone.

As shown in FIG. 3, the thermoelectric cooler 35 is aligned with the drive roll 11 and its associated pinch roll so that the strip of the web 10 which passes between those rolls is cooled by the element 35. At the edges of the web 10, on the other hand, the other drive rolls 11 and their associated pinch rolls are positioned in a narrow margin in which no printing occurs. Consequently, quenching is unnecessary in those regions.

In another platen embodiment, the quench zone downstream across the width of the paper. Such a quench zone may be, for example, a portion of the platen support member which has adequate heat sink capability to reduce the adjacent platen temperature to the desired level.

In operation, the platen 16 is heated when necessary by the heater 25 to raise it to the desired operating temperature. The vacuum pump 21 exhausts air from the housing 17 and draws air through the apertures 18 and 19, as indicated by the arrows in FIG. 2, to hold the web 10 in thermal contact with the platen 16 as it is advanced by the drive rolls 11 and associated pinch rolls 12. The ink jet head 13 sprays hot melt ink 15 onto the web 10 and the resulting increase in platen temperature is detected by the control unit 22, turning off the heater and causing the heat pump 20 to transfer thermal energy from the thermoelectric cooler 28 to the heat sink 30 and the fins 31 from which it is removed by the forced-air cooling system 32.

Figure 15:
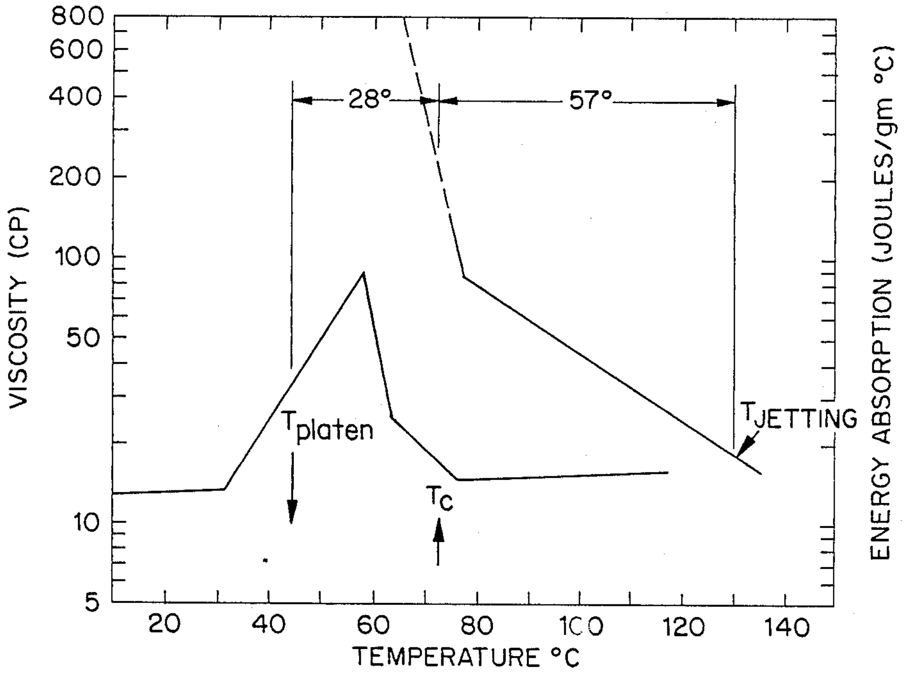
FIG. 15 is a schematic graphical representation illustrating the selection of appropriate platen temperature for still another type of hot melt ink.

For one type of hot melt ink having properties which are shown in FIG. 15, for example, the ink jet head 13 maintains the ink at a jetting temperature of, for example 130° C. but the melting point of the ink is, for example, about 58° C. and, to assure adequate penetration of the ink to provide the desired spot size and prevent an embossed appearance but avoid print-through, the platen 16 should be maintained at about 45° C. During normal operation of the ink jet apparatus, however, the ambient temperature of the platen assembly 14 and its surrounding components may approach or exceed 45° C. Accordingly, the heat pump 26 may be arranged to transfer heat continuously from the thermoelectric coolers 28 and 32 to the heat sink 30 or the substrate 10 may be moved away from the platen during quiescent periods in the operation of the system. During ink jet operation, moreover, especially operation in regions II and IV in FIG. 1, substantially more heat is extracted from the platen and transferred to the heat sink 30, which may thus be heated to a relatively high temperature of, for example, 70–75° C., and the heat energy is removed from the heat sink 30 and the fins 31 by the forced-air system 32. At the same time, the thermoelectric cooler 32 in the quench zone is maintained about 10° C. cooler than the melting point of the ink, for example, at 45° C., assuring complete solidification of ink before engagement by a pinch roll.

Because the size and nature of the printed image may vary widely, it is necessary to use a temperature-controlled platen with high lateral thermal conductivity in order to minimize temperature gradients from one side to the other. Aluminum and copper are suitable platen materials, but the cross-sectional area of the platen must be significant, on the order of 0.5 square inch or larger in the case of aluminum. Such platens are massive and may take much space and require high power or long times to heat up to operating temperature. For these reasons, a structure embodying the characteristics of a heat pipe with evaporation and condensation of liquid to transfer energy may be employed.

Other problems may occur in the control of the web as it moves across the platen in the print zone. One such problem relates to differential thermal expansion of film media (e.g., Mylar) and another relates to differential shrinkage of paper as it is heated and dried by the platen. In these cases, the web may buckle or cockle and move off the platen surface by 0.005 or more inches, which degrades the thermal connection between paper and platen and which also degrades dot placement accuracy by changing the point of impact of the jets, especially in the case of bidirectional printing.

Figure 4:
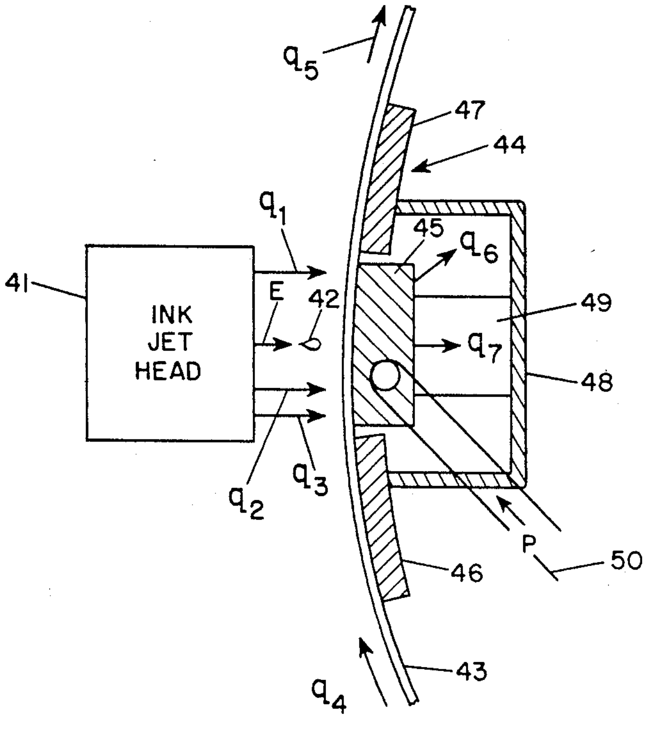
FIG. 4 is a schematic sectional view illustrating another embodiment of the invention and showing the energy flux into and out of the paper and platen system.

To avoid these problems, the platen configuration shown in FIG. 4 may be used. In this arrangement, an ink jet head 41 projects ink drops 42 toward a web of paper 43 supported by a curved platen 44 which causes the paper 43 to be held in curved configuration and thereby stiffened against buckling and cockling. A suitable curved platen 44 with a radius of curvature of about 5 to 10 inches has a temperature-controlled portion 45 of the type described with reference to FIG. 2 in the printing zone and a curved inlet portion 46 and a curved outlet portion 47. The inlet and outlet portions 46 and 47 extend at angles of at least 10° ahead of and 10° after the temperature-controlled portion 45.

Thus, the temperature-controlled portion need not extend for the entire length of the curved paper path, but may occupy only about one-half inch of paper length, the inlet portion 46 and outlet portion 47 of the curved paper path being at temperatures which are more suitable for paper handling or quenching-g prior to passing into paper feed rolls of the type shown in FIG. 2. A housing 48 encloses the temperature-control zone for the platen 45 and a temperature-control component 49 which may include a thermoelectric cooler of the type described with reference to FIG. 2 are mounted in contact with the platen 45 in the temperature-control zone. A power line 50 energizes the heater in the portion 45 when it is necessary to add heat to the platen.

In the arrangement shown in FIG. 4, the energy flux into and out of the paper/platen system is represented as follows:

Energy Flux Into Paper/Platen System $q_1$=radiant heat transfer from ink jet head 41.
$q_2$=conduction through the air.
$q_3$=convection from ink jet head 41 to platen.
E=enthalpy in the ink drops.
$q_4$=heat energy in entering paper at temperature $T_{in}$.
p=neat transferred by heater into platen.

Energy Flux Out of Paper/Platen System $q_5$=heat energy exiting with the paper and ink at temperature $T_{out}$.

$q_6$=heat energy removed from platen by convective heat transfer to the air.

$q_7$=heat removed from platen by conduction through mounts and/or by heat pump action.

As described above, it is advantageous to control the temperature of the substrate and, in specific circumstances, the temperature of the substrate may be controlled at a selected level which may be above or below the melting point of the ink based upon the characteristics and jetting parameters of the ink. The selection of the desired temperature level will be explained hereinafter.

The temperature at which the ink is jetted from the printhead is selected so as to provide a suitable viscosity for the ink and at the same time avoid thermal degradation of the ink and the ink jet head. Suitable temperatures may be in the range from 110° C. to 140° C. and preferably in the range from 120° C. to 130° C. The ink viscosity at the jetting temperature should be in the range from about 10 centipoise (cp) to 35 cp and preferably in the range from 15 cp to 25 cp. A particular ink having the characteristics illustrated in FIG. 11, jetted at a temperature of about 120° C., providing a viscosity of about 15 cp, is appropriate for a specific ink jet head design. After an ink drop has been ejected from the orifice in the ink jet head, it travels through an air gap of about 0.5 to 3 millimeters at an average velocity of at least 1 meter per second and preferably in the range from 2 to 12 meters/sec. so that the flight time is a fraction of a millisecond during which the drop is cooled only slightly, arriving at the paper surface within about 1-2° C. of the jetting temperature.

Preferably, adjacent ink spots produced on a substrate by an ink jet system will have an overlap of about 10-15%. To accomplish this with spot spacing of about 300 dots per inch, the spot size should have a diameter of about 5 to 5.3 mils. For this purpose, ink drops having a volume of about 75-85 picoliters (pl) are preferable, although drops having volume in the range from 50 to 100 pl may be appropriate. A spherical drop having a volume of 85 pl has a diameter of only 2.14 mils, which would be far too small to produce a spot of desired size without substantial spreading of the ink in the substrate.

Figure 5:
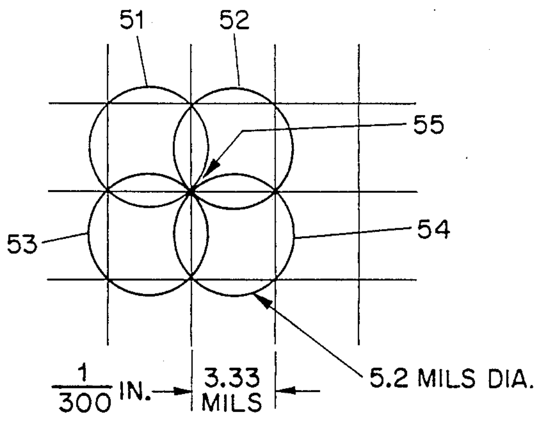
FIG. 5 is a diagram illustrating the coverage on a substrate provided by adjacent ink spots which have spread in a controlled manner in accordance with the invention.
Figure 6:
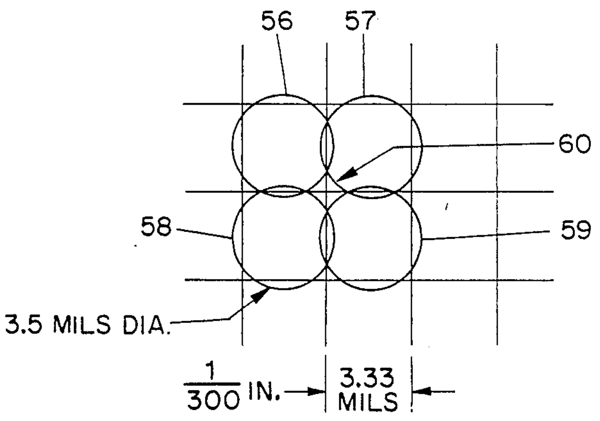
FIG. 6 is a diagram similar to FIG. 5 illustrating lack of coverage on a substrate where adjacent ink spots have not spread sufficiently.

The desired spot overlap condition is illustrated in FIG. 5 which shows four ink spots, 51, 52, 53 and 54, having centers spaced by 3.33 mils in both directions and having diameters of 5.2 mils so as to provide full overlap giving complete coverage at a central point 55 of the four spots. In contrast, FIG. 6 shows four drops, 56, 57, 58 and 59, having the same spacing between centers, but having 3.5 mil diameter, leaving an area 60 at the center with no coverage.

Heretofore, it has been assumed that ink drops from a hot melt ink jet spread instantly upon impact with the substrate to form flat "pancakes" which are much larger in diameter than the ink drop and which are close to the desired spot size, and it is generally assumed that the momentum of the ink drop is adequate to create the spread. For hot melt inks having viscosity in the range of about 10-35 cp and surface tensions in the range of about 10-40 dynes/cm with impact velocities of about 2-10 meters/sec., however, the spot diameter is not primarily dependent upon the momentum of the drop at the time of impact. For these conditions, the impact produces only a very small amount of spread which is insufficient to produce a spot of the desired diameter. Typically, the drop impact lasts for only a few microseconds, i.e., the time required for the tail of the drop moving at a velocity of a few meters/sec. to travel the length of the tail during this impact period. No substantial heat transfer occurs between the drop and the substrate during this time and the partially collapsed drop produces a deformed spheroid which sits lightly on top of the paper fibers.

Figure 7:
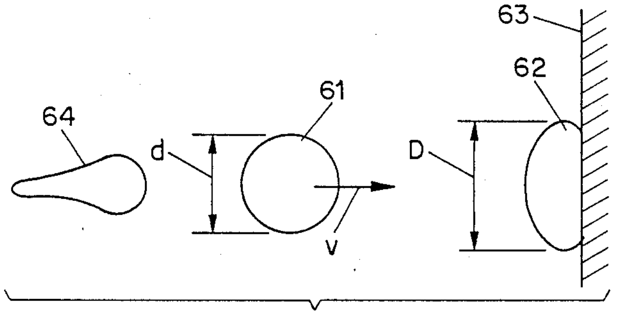
FIG. 7 is a schematic view illustrating the travel of hot melt ink drops toward a substrate and the flattening effect resulting from impact of a drop with the substrate.
Figure 8:
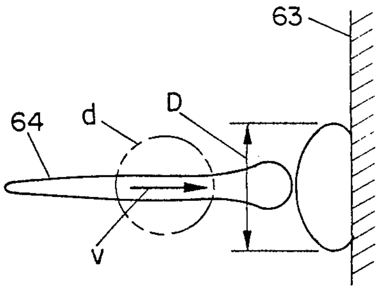
FIG. 8 is a view similar to that of FIG. 7 showing the impact of an elongated ink drop.
Figure 9:
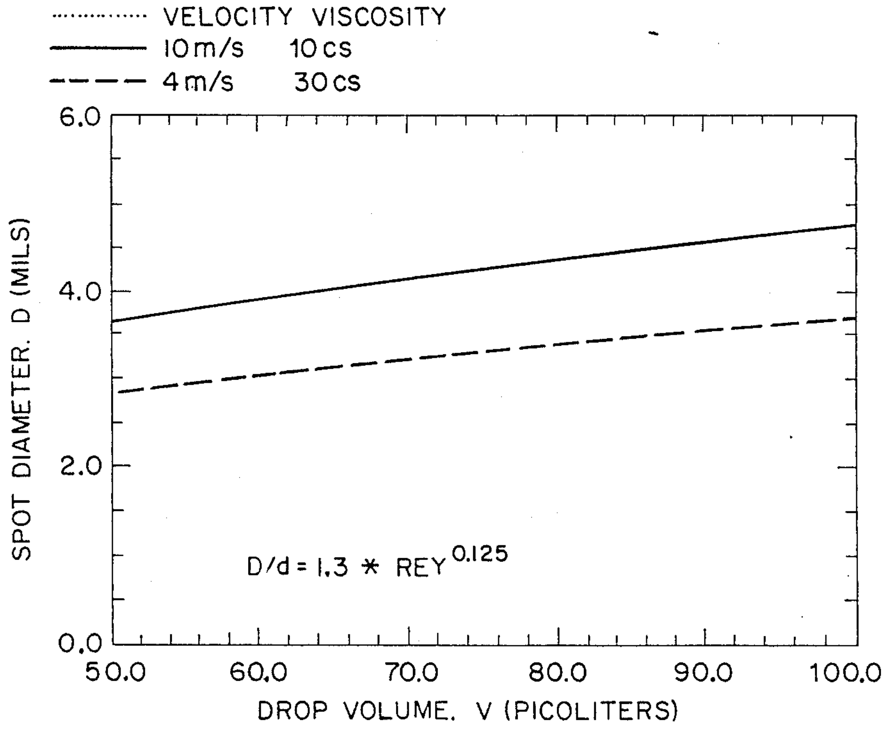
FIG. 9 is a graphical representation illustrating the relation between the volume of an ink drop and the resulting diameter of a spot following impact of the drop with the substrate at selected drop velocities and viscosities.

This is shown in FIG. 7, in which a drop 61 having a diameter d and a jetting velocity v produces a slightly flattened spheroid 62 with a major diameter D upon impact with a substrate 63. FIG. 8 shows the equivalent drop diameter for an elongated drop 64. The relationship between the equivalent spherical drop diameter d for an elongated drop 64 to that of the partially collapsed spheroid D immediately after impact is shown in the graph of FIG. 9. This spreading ratio is determined by dissipation of the momentum of the ink in the drop by viscous damping internal to the drop as it flattens, and since the momentum is only related to the mass of the drop and to its mean velocity, the initial shape of the drop is not of great significance. Hence, drops which may have a tail as shown by the drop 64 in FIGS. 7 and 8 or may be elongated cylindrical jets behave substantially the same as the equivalent mass of ink in a spherical form such as the drop 61 in FIG. 7 travelling at the same mean velocity v. Since all of the determinants of momentum and viscosity are contained in the Reynolds number (Rey) for the drop, it can be shown that the drop spread ratio is approximated by the equation $D/d=1.3\,(Rey)^{0.125}$. For an 85 pl drop with viscosity 30 centistokes at an impact velocity of 4 meters/sec., the spot diameter at the completion of impact is only 3.5 mils, which, as shown in FIG. 6, is far less than that desired for full overlap.

Figure 10A:
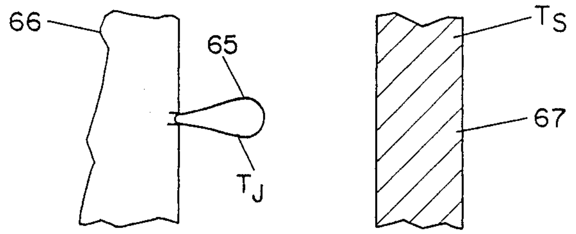
FIGS. 10A–10F are schematic sectional views illustrating the progress of an ink drop following ejection from an ink jet head and impact on the substrate and showing the successive steps involved in the spreading of the drop on the substrate.
Figure 10B:
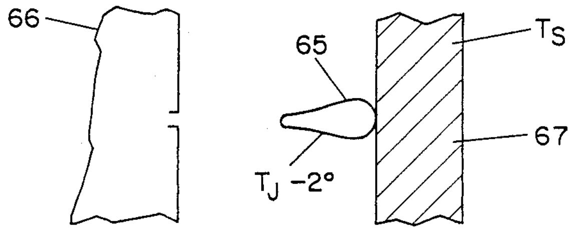
Figure 10C:
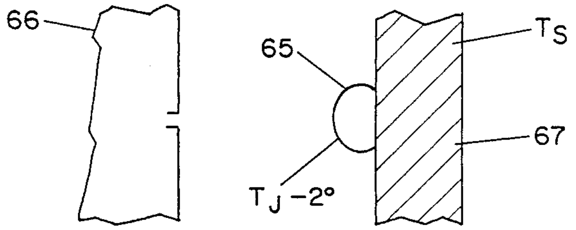

FIGS. 10A–10F illustrate the sequence of events occurring following drop ejection. FIG. 10A shows a drop of ink 65 being ejected from an ink jet head 66 at the temperature $T_J$ of the head toward a substrate 67 having a temperature $T_S$. At the start of impact of the drop 65 with the substrate 67, as shown in FIG. 10B, the drop has a temperature of about $T_J-2°$ C. At the end of impact, about 10 microseconds later, the drop 65 has flattened slightly but still has the same temperature as shown in FIG. 10C.

Figure 10D:
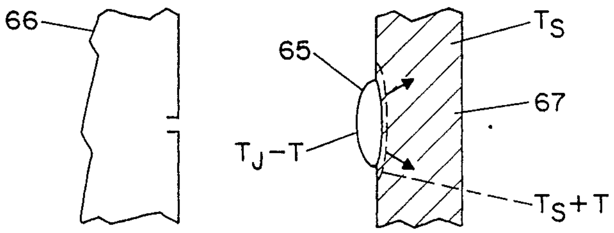
Figure 10E:
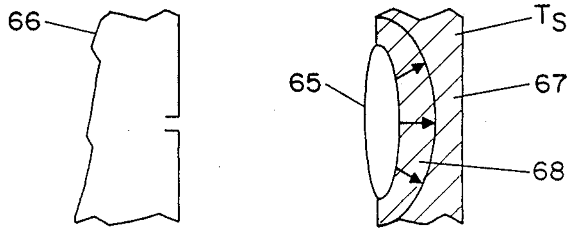

During the next phase of drop spread shown in FIG. 10D, which lasts about 10 milliseconds, the hot ink in the drop 65 heats the substrate fibers and wets them, reducing the temperature of the ink drop by T degrees and raising the temperature of the adjacent substrate by a corresponding amount. Wicking of the ink into the substrate is driven by surface tension, which for hot melt inks is about 10–40 dynes/cm, and for any given ink will be substantially constant for a broad range of substrates, and is also substantially constant for all temperatures from the jetting temperature to below the melting point of the ink. At the beginning of the drop wicking phase, the temperature of the ink in the bulk of the deformed spheroid is within a few degrees of the printhead temperature, the drop having lost no more than about 1° C. or 2° C. during its travel to the substrate. Wicking is accompanied by convection of the latent and sensible heat in the ink drop 65 as it flows over and into the substrate 67, as well as by conduction of heat through fibers in advance of the ink, providing a thermal wave 68 as shown in FIG. 10E.

Figure 10F:
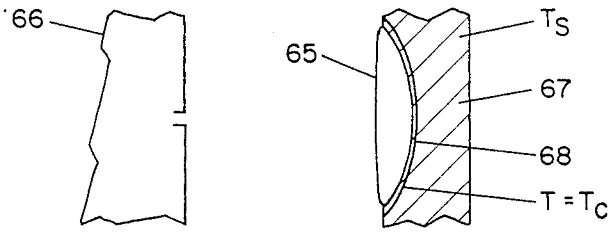

As the ink wicks into the substrate, which continues for about 50 milliseconds, the advancing portion of the ink loses heat energy into the fibers until, at the periphery of the ink spot, the temperature is reduced and, correspondingly, the viscosity increases sufficiently to reach a critical level so as to inhibit further enlargement of the spot as shown in FIG. 10F.

For hot melt inks which have a substantially crystalline basis system, it may be appropriate (albeit simplistic) to consider that the ink freezes at a specific temperature, so that above this temperature the viscosity remains similar to or slightly above that at which it is jetted, and as it cools to the melting point, the viscosity rises to an extremely high value which for practical purposes is equivalent to a for most organic inks, these narrow melting range inks would have, as a common liability, the fact that they are substantially opaque when solid due to crystallinity, and hence they are less useful as wide gamut subtractive color inks when overlaid on paper, and their opacity prevents them from being used for overhead projection transparencies in color.

Figure 11:
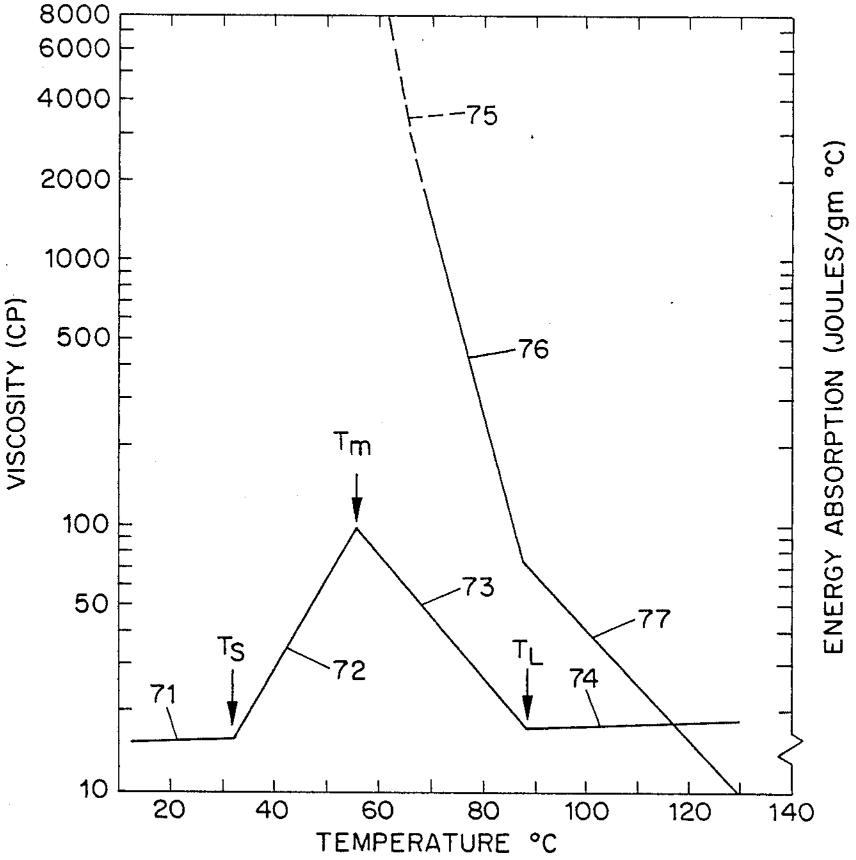
FIG. 11 is a schematic graphical representation illustrating the variation of specific heat and viscosity with temperature for one type of hot melt ink which has a broad melting range.

Inks with noncrystalline structure are likely to have broad melting ranges, over which the physical and thermal characteristics are likely to vary as shown for a typical ink having the characteristics shown in FIG. 11. As the temperature of this ink is raised, it first absorbs energy at a substantially constant rate, represented by the line 71, until it begins to soften at point $T_S$ at 32° C. Thereafter, the apparent specific heat increases, as shown by the line 72, rising to a characteristic peak at the melting point $T_m$ at 55° C., after which the rate of energy absorption decreases as shown by the line 73 until the ink is completely liquid at a temperature $T_L$ of 88° C., and thereafter the energy absorption per degree increases only slowly with temperature rise as shown by the line 74. The plot of this relationship is a schematic simplification of an actual curve taken from a Differential Scanning Calorimeter (DSC) apparatus. One skilled in the art will understand that there are subtle differences between this simplified representation and the actual curves, but such differences are not meaningful for the purposes of this description.

For this specific ink, the viscosity is non-Newtonian and very high until the temperature is 8–12° C. above the melting point as shown by the dotted-line segment 75 in FIG. 11. Thereafter, as the temperature is raised toward the liquidus temperature $T_L$, the viscosity follows a relationship with temperature shown by the segment 76 such that log viscosity is proportional to $K_1/T$, where T is measured in degrees relative to absolute zero. Once the temperature is above $T_L$, the relationship follows a different and lower slope represented by the line 77, closely approximated by log viscosity proportional to $K_2/T$, until the temperature is substantially above the jetting temperature which may be 120° C., providing a viscosity of about 15 cp. One skilled in the art will also recognize that this description of the viscosity versus temperature is a schematic simplification, but that the difference from the actual characteristics is not meaningful to the point under consideration.

Figure 12:
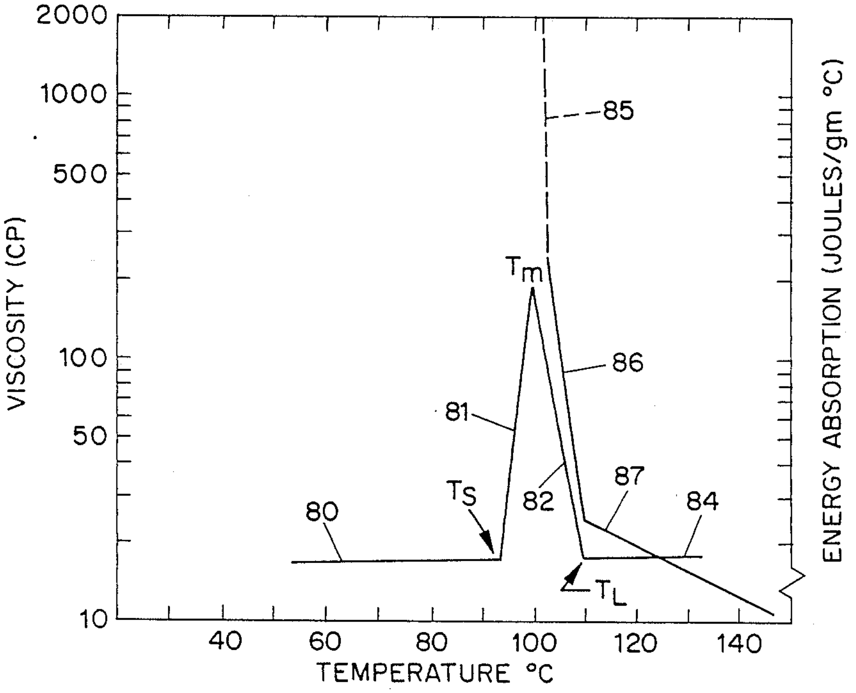
FIG. 12 is a schematic graphical representation showing the variation of specific heat and viscosity with temperature for another type of hot melt ink which has a narrow melting range.

For comparative purposes, FIG. 12 shows the characteristics of an ink having a substantially crystalline basis system having a narrow melting range closer to an "ideal liquid", which most people conceptualize as melting at a single point. In this case, the specific heat below the softening point $T_S$, which is about 95° C., increases slowly with increasing temperature as shown by the line 80. Thereafter, the specific heat increases rapidly with temperature as shown by the line 81 to the melting point $T_m$ at 100° C.

Above the melting point, the specific heat drops rapidly with increasing temperature, as shown by the line 82 in FIG. 12, to the liquidus temperature $T_L$ at 110° C. and thereafter the specific heat increases slowly with temperature as shown by the line 84. For this ink, the viscosity is very high until the temperature is a few degrees above the melting point, as shown by the dotted-line segment 85 in FIG. 12, and drops sharply with temperature as shown by the line 86 to reach a level of about 25 cp at the liquidus temperature $T_L$, Above that temperature, the viscosity decreases with temperature at a lower rate as shown by the line 87.

For most porous or fibrous substrates, a viscosity in excess of 200 cp is adequate to slow the spot enlargement rate such that the spreading ink flow cannot follow the advancing thermal wave which precedes the ink via conduction. To control spot spread while ensuring adequate penetration in accordance with the invention, a first aliquot of heat energy is supplied via the ink drop and a second aliquot of heat energy is supplied via control of the initial substrate temperature. For this purpose, a critical ink temperature $T_c$ at which a selected viscosity in the range of about 200–300 cp is determined. This temperature is subtracted from the desired ink-jetting temperature. The result is related to the energy aliquot in the ink which is available to heat the substrate temperature to the critical temperature $T_c$. One-half of this temperature difference is subtracted from $T_c$ to define the proper initial temperature of the substrate. The substrate may be maintained at this temperature by controlling the support platen at this temperature as described above.

Figure 13:
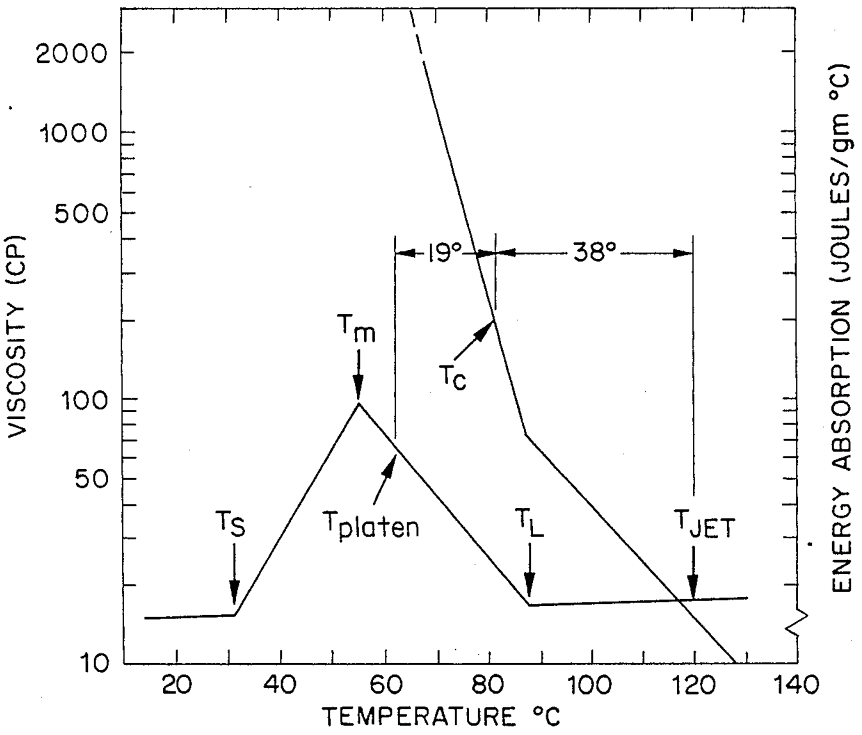
FIG. 13 is a schematic graphical representation illustrating the selection of an appropriate platen temperature for a particular jetting temperature using hot melt ink having the characteristics shown in FIG. 11.

As an example, an ink having the characteristics shown in FIG. 11 may be jetted at 120° C. at a viscosity 15 cp. Using a 200 cp viscosity value, the critical temperature $T_c$ for this ink is 82° C., and there are 38° C. of useful enthalpy above that point. Accordingly, subtracting half of 38° C. from $T_c$, the proper platen temperature is 63° C. This is illustrated in FIG. 13. Printing with this ink under these conditions results in full penetration with no embossed characteristic and without show-through on a wide variety of ordinary office papers. On the other hand, using a substrate temperature of 67–70° C. results in a fuzzy line and show-through, and with substrate temperatures of about 55° C., embossed images may be perceived, while at substrate temperatures of 45° C., the images are substantially embossed, and adherence and smear resistance of the ink are poor.

Figure 14:
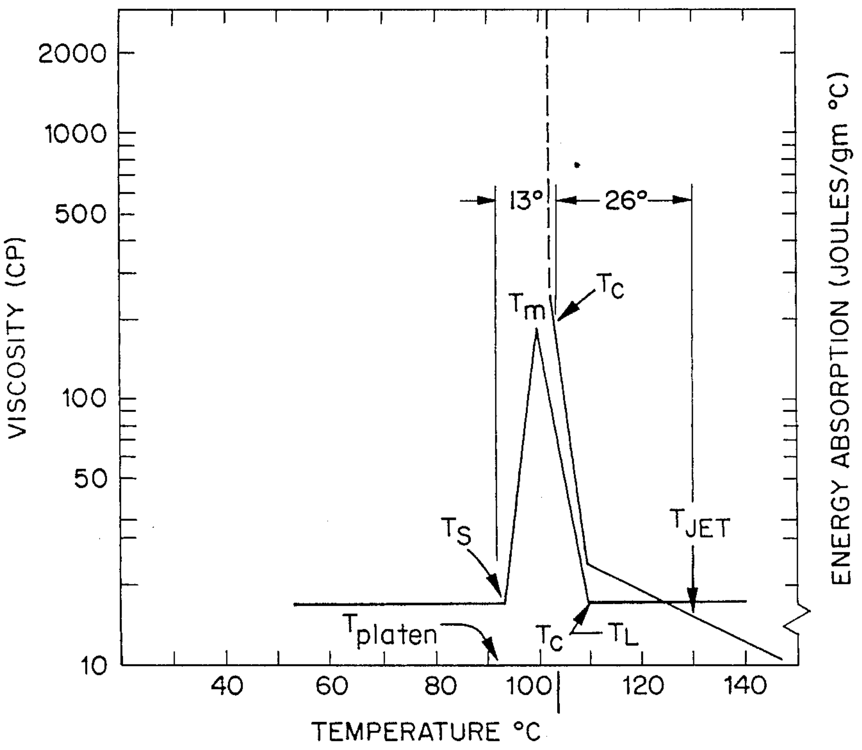
FIG. 14 is a schematic graphical representation similar to that of FIG. 13 illustrating the selection of an appropriate platen temperature for a hot melt ink having the characteristics illustrated in FIG. 12.

For ink having the characteristics shown in FIG. 12, which is jetted at a temperature only slightly above its melting point, i.e., at 130° C. and 15 cp viscosity, the difference between $T_c$, which is 104° C. for 200 cp viscosity, and the jetting temperature is 26° C. Subtracting half this from 104° C. results in a predicted optimal platen temperature of 91° C. This is illustrated in FIG. 14. Control of the substrate temperature to this high value was not possible with the particular test equipment used, but images produced with that ink at lower temperatures are highly embossed.

FIG. 15 illustrates the application of the invention with still another ink having different characteristics. This ink has a melting point $T_m$ of 58° C. and has an apparent viscosity of 200 cp at about 73° C. If the jetting temperature is 130° C., i.e., 57° C. above the critical temperature, the platen should be maintained at 28° C. below 73° C., or about 45° C. Thus, in this case, as in the instance illustrated in FIG. 14, the platen temperature should be maintained below the melting point of the ink, whereas in FIG. 13 the platen is maintained above the melting point.

From FIG. 13 it will be apparent that, if the critical temperature is 82° C., corresponding to a viscosity of 200 cp, jetting temperatures of 110° C., 120° C. and 130° C., respectively, require corresponding platen temperatures of 68° C., 63° C. and 58° C., or 13° C., 8° C. and 3° C., respectively, above the 55° C. melting point of the ink If the critical temperature is 79° C., corresponding to a viscosity of 300 cp, jetting temperatures of 110° C., 120° C. and 130° C., respectively, require corresponding platen temperatures of 63° C., 58° C. and 53° C., or 8° C. above, 3° C. above and 2° C. below, respectively, the 55° C. melting point of the ink.

A similar analysis with respect to FIGS. 14 and 15 shows a range of platen temperatures from 12° C. below the melting point to 1° C. above the melting point for FIG. 14 and a range of platen temperatures from 17° C. below to 4° C. below the melting point for FIG. 15.

Thus, as a general rule, depending upon the characteristics of the ink and the jetting temperature, the platen temperatures should be maintained at a temperature in the range from about 20° C. below to about 20° C. above the melting point of the ink, and preferably at a temperature in the range from about 15° C. below to about 15° C. above the melting point of the ink.

The foregoing examples are not intended to be representative of the full range of hot melt ink characteristics, but have been chosen to demonstrate how the proper substrate temperature for controlled ink penetration can vary over a wide range, and may be either below or above the melting point.

It should also be noted that the time during which the substrate is maintained on the heated platen is not a major factor in determining the final ink spot size as long as that time does not exceed about 0.5–1 seconds, as would occur during uninterrupted printing. Penetration of the ink drop and spreading of the ink requires about 10–50 milliseconds to produce a spot having a diameter approximately 90% of the final spot diameter. During the final enlargement of the spot, the rate of spreading is much smaller than immediately after impact of the drop and, in virtually all modes of operation of the apparatus illustrated in FIG. 2, each region of the paper will spend at least about 30–50 milliseconds on the heated platen 14 before being transported to a cooler zone. Consequently, with the illustrated arrangement sufficient drop spreading is ensured for all modes of operation.

In those instances in which a printed portion of the data controller which controls the ink jet is waiting for further information, for more than about one second, the substrate may be advanced so that the printed portion is no longer in contact with the heated portion of the platen until the controller is ready to continue printing, after which the substrate is restored to the same position. Alternatively, the paper may be separated from the platen by moving it toward the ink jet head or moving the platen away from the paper during such waiting periods so as to avoid overheating of the printed image which might cause print-through.

In order to maintain the substrate temperature at a selected level so as to obtain desired results, the platen temperature should preferably be controllable within about 2–3° C. of a selected point, and the cooler 28 and heater 25 should be capable of removing or adding heat rapidly to the platen. If the platen temperature selection procedure results in a platen temperature which is excessively high, it is also possible to achieve the desired penetration by increasing the jetting temperature of the ink. Correspondingly, if the required printhead temperature becomes too high, it should be possible to modify the characteristics of the ink so that the critical temperature falls at the appropriate ratio between the available platen control temperature and desired jetting temperature.

It should be noted that the procedure described herein for determining the proper platen operating temperature does not provide an exact ratio, but may be modified as system parameters change. For example, the critical ink spreading temperature $T_c$ has been defined to be about 200–300 cp in the context of an ink surface tension of 10–40 dynes/cm. If the surface tension of the ink increases or decreases, the critical ink spread-limiting viscosity should be increased or decreased proportionally.

Similarly, the 2:1 ratio of the difference between the jetting temperature and the critical temperature and the difference between the critical temperature and the platen temperature is not intended to be precise, and it has been defined for the case where the specific heat of the paper is about 1.3 to 1.7, joules per gram ° C., and where the average useful specific heat of the ink between $T_c$ and the jetting temperature is in the range from 2.0 to 2.5 joules per gram ° C. If the substrate and ink properties fall outside this range, it will be necessary to adjust the temperature difference ratio proportionally.

It should be noted that the drop spread control method should not be limited to merely using a value of about one-half for the ratio of the difference between the platen temperature and the critical temperature to the difference between the jetting temperature and the critical temperature to produce nonembossed images, as the procedure described herein may be applied so as to purposely produce embossing by providing less drop spreading, if user requirements dictate this effect. In the case of full embossing, the correct ratio of the temperature differences would be between about 1:1 and 2:1. When printing on nonpaper substrates, for example, on polyester film to create transparencies, the above guidelines should be modified so as to increase by about 25–50% the amount of energy available for drop spread. In that case, the ratio may, for example, be between about one-quarter and about one-half. To satisfy the enthalpy requirement for such cases, the platen temperature may, for example, be in a range from about 25° C. above the melting point of the ink to about 25° C. below the melting point of the ink.

Although the invention has been described herein with reference to specific embodiments, many modifications and variations therein will readily occur to those skilled in the art. Accordingly, all such variations and modifications are included within the intended scope of the invention.

I claim:

1. A hot melt ink system comprising a hot melt ink having a melting point, ink jet means for projecting the hot melt ink at elevated temperature toward a substrate to produce ink spots on the substrate, platen means for supporting the substrate, and temperature control means for controlling the temperature of the paten means to maintain the portion of a substrate which receives the hot melt ink from the ink jet means at a temperature in the range from about 25° C. below to about 25° C. above the melting point of the hot melt ink.

2. A hot melt ink jet system comprising a hot melt ink having a melting point, ink jet means for projecting the hot melt ink at elevated temperature toward a substrate to produce ink spots on the substrate, platen means for supporting the substrate, and temperature control means for controlling the temperature of the platen means to maintain the portion of a substrate which receives the hot melt ink from the ink jet means at a temperature in the range from about 25° C. below to about 25° C. above the melting point of the hot melt ink wherein the temperature control means controls the temperature of the platen means to maintain the substrate at a temperature which is below the temperature at which the ink viscosity is 200 cp by a temperature difference in the range from about one-quarter to twice the difference between the elevated temperature and the temperature at which the ink has a viscosity of about 200 cp.

3. A hot melt ink jet system according to claim 2 wherein the substrate is maintained at a temperature which is below the temperature at which the ink viscosity is 200 cp by approximately one-half the difference between the elevated temperature and the temperature at which the ink viscosity is 200 cp.

4. A hot melt ink jet system according to claim 2 wherein the substrate is maintained at a temperature which is below the temperature at which the ink viscosity is 200 cp by a temperature difference which is between about one and two times the difference between the elevated temperature and the temperature at which the ink viscosity is 200 cp.

5. A hot melt ink jet system according to claim 2 wherein the substrate is maintained at a temperature which is below the temperature at which the ink viscosity is 200 cp by a temperature difference which is between about one-quarter and one-half the difference between the elevated temperature and the temperature at which the ink viscosity is 200 cp.

6. A hot melt ink jet system according to claim 1 wherein the hot melt ink has a viscosity in the range from about 10 cp to about 35 cp at the elevated temperature.

7. A hot melt ink jet system according to claim 1 wherein the hot melt ink has a viscosity in the range from about 15 cp to about 25 cp at the elevated temperature.

8. A hot melt ink jet system according to claim 1 wherein the hot melt ink has a surface tension in the range from about 10–40 dynes/cm at the elevated temperature.

9. A hot melt ink jet system according to claim 1 wherein the hot melt ink is projected from the ink jet means in drops having a volume in the range from about 50–100 picoliters.

10. A hot melt ink jet system comprising a hot melt ink having a melting point, ink jet means for projecting the hot melt ink at elevated temperature toward a substrate to produce ink spots on the substrate, platen mans for supporting the substrate, and temperature control means for controlling the temperature of the platen means to maintain the portion of a substrate which receives the hot melt ink from the ink jet means at a temperature in the range from about 25° C. below to about 25° C. above the melting point of the hot melt ink including a fibrous substrate supported on the platen means, a first plurality of ink drops having a selected diameter projected from the ink jet means toward a first region of the substrate, a second plurality of ink drops on the surface of a second region of the substrate immediately adjacent to the first region having a diameter no more than about 50% greater than the selected diameter, and a third plurality of ink spots on the substrate at a third region farther from the first region than the second region, wherein the ink drops in the third region have been absorbed by the fibrous substrate and have a diameter at least twice the selected diameter.

11. A hot melt ink for use in an ink jet system having an ink jet head which projects hot melt ink at an elevated temperature in the range from about 110° C. to about 140° C. at a viscosity in the range from about 10 cp to about 35 cp toward a substrate having a lower temperature in the range from about 45° C. to about 91° C. comprising an ink having a viscosity in the range from about 200 cp to about 300 cp in the temperature range from about 73° C. to about 104° C.

12. A hot melt ink according to claim 11 having a viscosity in the range from about 200 cp to about 300 cp in the temperature range from about 79° C. to about 104° C.

13. A hot melt ink according to claim 11 having a viscosity in the range from about 10 cp to about 35 cp in the range from about 120° C. to 130° C.

14. A hot melt ink for use in an ink jet system having an ink jet head which projects hot melt ink at an elevated temperature in the range from about 110° C. to about 140° C. at a viscosity in the range from about 10 cp to about 35 cp toward a substrate having a temperature in the range from about 45° C. to about 91° C. comprising an ink having a viscosity in the range from about 200 cp to about 300 cp at a temperature which is above the substrate temperature by about one-third the difference between the substrate temperature and the elevated temperature.

* * * * *

UNITED STATES PATENT AND TRADEMARK OFFICE
CERTIFICATE OF CORRECTION

PATENT NO. : 4,951,067

DATED : August 21, 1990

INVENTOR(S) : Charles W. Spehrley, Jr.

It is certified that error appears in the above-identified patent and that said Letters Patent is hereby corrected as shown below:

First page, Abstract, line 1: The word "particulate" should read --particular--; 2nd column, last line: The words "10 Drawing Sheets" should read --7 Drawing Sheets--.

Column 6, line 61: After "platen 16" insert --and the adjacent vacuum slits 18 and 19 extend substantially across--.

Column 7, line 23: After "fins 31" insert --for radiative and convective heat dissipation and is provided--; line 25: Before "rate" insert --enough--; line 61: After "downstream" insert --of the temperature-controlled platen may be provided completely--.

Column 9, line 14: The word "quenching-g" should read --quenching--.

Column 11, line 49: After "to a" insert --solid. However, in addition to being an oversimplification--.

Column 14, line 23: Before "data" insert --substrate is held stationary against the platen, such as when the--.

UNITED STATES PATENT AND TRADEMARK OFFICE

CERTIFICATE OF CORRECTION

PATENT NO. : 4,951,067

DATED : August 21, 1990

INVENTOR(S) : Charles W. Spehrley, Jr.

It is certified that error appears in the above-identified patent and that said Letters Patent is hereby corrected as shown below:

Column 15, line 36: The word "paten" should read --platen--.

Signed and Sealed this

Thirty-first Day of March, 1992

*Attest:*

HARRY F. MANBECK, JR.

*Attesting Officer*

*Commissioner of Patents and Trademarks*